United States Patent [19]
Stephenson

[11] Patent Number: 5,822,637
[45] Date of Patent: Oct. 13, 1998

[54] ELECTRONIC CAMERA AND ATTACHABLE PRINTER

[75] Inventor: Stanley W. Stephenson, Spencerport, N.Y.

[73] Assignee: Eastman Kodak Company, Rochester, N.Y.

[21] Appl. No.: 940,772

[22] Filed: Sep. 30, 1997

[51] Int. Cl.$^6$ .................................................. G03B 29/00
[52] U.S. Cl. ........................... 396/429; 396/30; 358/906; 358/909.1
[58] Field of Search .............................. 396/30, 374, 429, 396/430, 479, 483; 358/906, 909.1, 302; 348/552, 839

[56] References Cited

U.S. PATENT DOCUMENTS

| | | | |
|---|---|---|---|
| 4,262,301 | 4/1981 | Erlichman | 358/906 |
| 4,768,050 | 8/1988 | Beery . | |
| 4,937,676 | 6/1990 | Finelli et al. | 358/906 |
| 5,032,911 | 7/1991 | Takimoto . | |
| 5,049,902 | 9/1991 | Duke . | |
| 5,122,432 | 6/1992 | Hammann, IV et al. . | |
| 5,493,409 | 2/1996 | Maeda et al. | 396/429 |
| 5,715,234 | 2/1998 | Stephenson et al. | 396/429 |

*Primary Examiner*—A. A. Mathews
*Attorney, Agent, or Firm*—Raymond L. Owens

[57] ABSTRACT

Apparatus for capturing and printing images on photosensitive sheets including a camera for electronically storing an image of a subject and having a display for displaying such stored image and a printer including light tight storage means for receiving a stack of photosensitive sheets. The images from the display are imaged onto a photosensitive sheet at the exposure position. The printer further includes a movable shutter member having a shutter aperture and the apparatus moves the movable shutter member across the displayed image for causing the shutter aperture to sequentially expose portions of the displayed image onto a photographic sheet until the entire displayed image is exposed onto such photographic sheet.

6 Claims, 6 Drawing Sheets

ELECTRONIC CAMERA AND ATTACHABLE PRINTER

CROSS REFERENCE TO RELATED APPLICATIONS

The present invention is related to commonly assigned U.S. Patent Application Ser. No. 08/824,694, filed Apr. 8, 1997; U.S. Patent Application Ser. No. 08/778,233, filed Jan. 8, 1997; now U.S. Pat. No. 5,715,493, and U.S. Patent Application Ser. No. 08/792,341, filed Jan. 31, 1997, now U.S. Pat. No. 5,715,492. The disclosure of these related applications is incorporated herein by reference.

FIELD OF THE INVENTION

The present invention relates to electronic cameras and to the printing of images produced by such cameras.

BACKGROUND OF THE INVENTION

It is known in the prior art to provide an electronic camera which uses an area image sensor. Digital images produced from the image sensors are stored in memory and these images can be shown on a display so that the user can determine which image should be stored for use in producing hard copy images. Typically, these images can be stored in a magnetic disk or a compact PCMCIA Flash RAM Card or dedicated memory within the electronic camera.

A shortcoming with prior electronic cameras is that data must be transmitted from the electronic camera to printer. Interfaces must be present to transfer the data. As disclosed in U.S. Pat. No. 5,032,911, printers that write to light sensitive media print must have a structure within the printer that operate on received data and convert the data into modulated light to mark the photosensitive sheet.

SUMMARY OF THE INVENTION

It is an object of the present invention to make use of an electronic image display in an electronic camera to write directly onto light sensitive media which can effectively provide a hard copy.

This object is achieved by an apparatus for capturing and printing images on photosensitive sheets, comprising:

a) a camera for electronically storing an image of a subject and having a display for displaying such stored image;

b) a printer including light tight storage means for receiving a stack of photosensitive sheets; and c) means for imaging the display image onto a photosensitive sheet at the exposure position including:
   i) the printer including a movable shutter member having a shutter aperture and means for moving the movable shutter member across the displayed image for causing the shutter aperture to sequentially expose portions of the displayed image onto the photographic sheet until the entire displayed image is exposed onto such photographic sheet.

ADVANTAGES

A feature of this invention is that a camera display is used to directly write onto the light sensitive sheet. A simple, inexpensive shuttering mechanism protects and exposes the media. Moreover, the printer does not require electronic interconnect between camera and printer to expose the media. Nothing is required to manipulate the data on the display or to modulate the display illuminator to expose the media.

DETAILED DESCRIPTION OF THE INVENTION

The invention is directed to a compact printer used in conjunction with electronic cameras. Such cameras often have a flat panel color display that is used to frame and/or review capture images. Separable printers exist that receive data from said electronic capture devices. Typically, interface electronics is disposed in each device and data is transmitted from the electronic camera to the printer.

Figure 1:
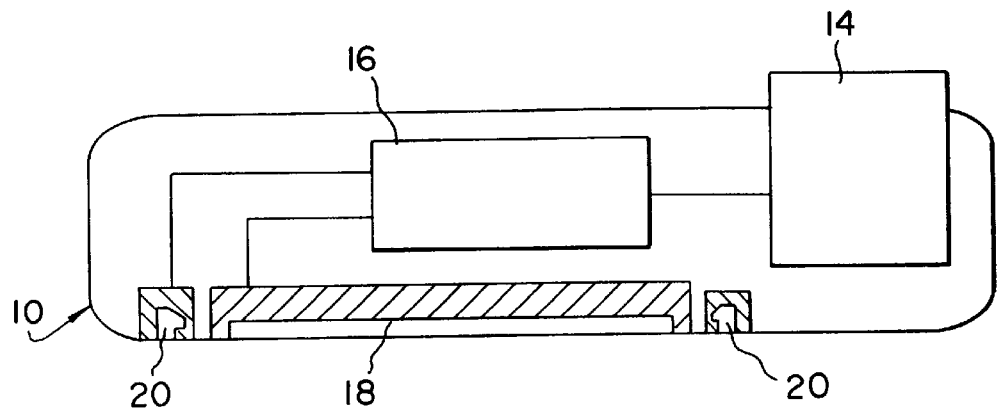
FIG. 1 is a top sectional view of an electronic camera which is adapted to be coupled to a printer in accordance with the present invention.
Figure 2:
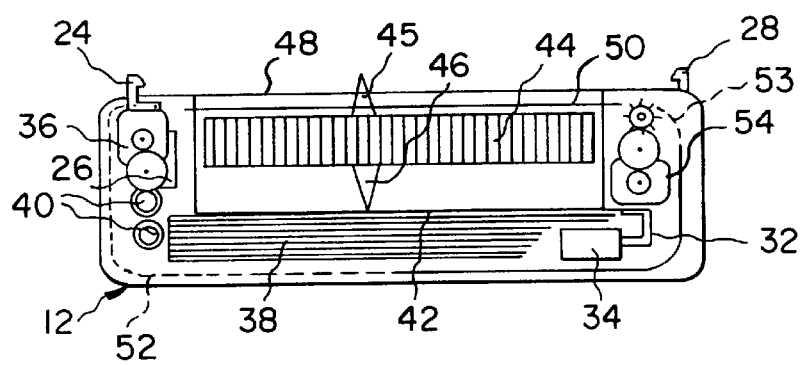
FIG. 2 is a top sectional view of the printer which is adapted to be coupled to the electronic camera of FIG. 1.

Turning now to FIG. 1, an electronic camera 10 is shown, and to FIG. 2, where a printer 12 is shown. Electronic camera 10 is of conventional design and can capture either still or motion images. The electronic camera being adapted to electronically store an image of a subject and having a display 18 for displaying such stored image. Images are captured by camera head 14 and transferred to camera electronics 16. Camera electronics 16 is capable of displaying still images on camera display 18. Camera display 18 can be, for instance, a LCD or organic polymer display system of conventional design.

Electronic camera 10, in accordance with the present invention, includes the additional modification of camera sockets 20 for the purpose of securing the printer 12 over camera display 18. At least one of the sockets 20 can furthermore incorporate electronic sensing circuitry to sense that printer 12 is attached and to activate camera display 18. Electronic sensing circuitry can be a simple switch, a magnetic switch or an optical switch disposed at the contact area between electronic camera 10 and printer 12.

Figure 5:
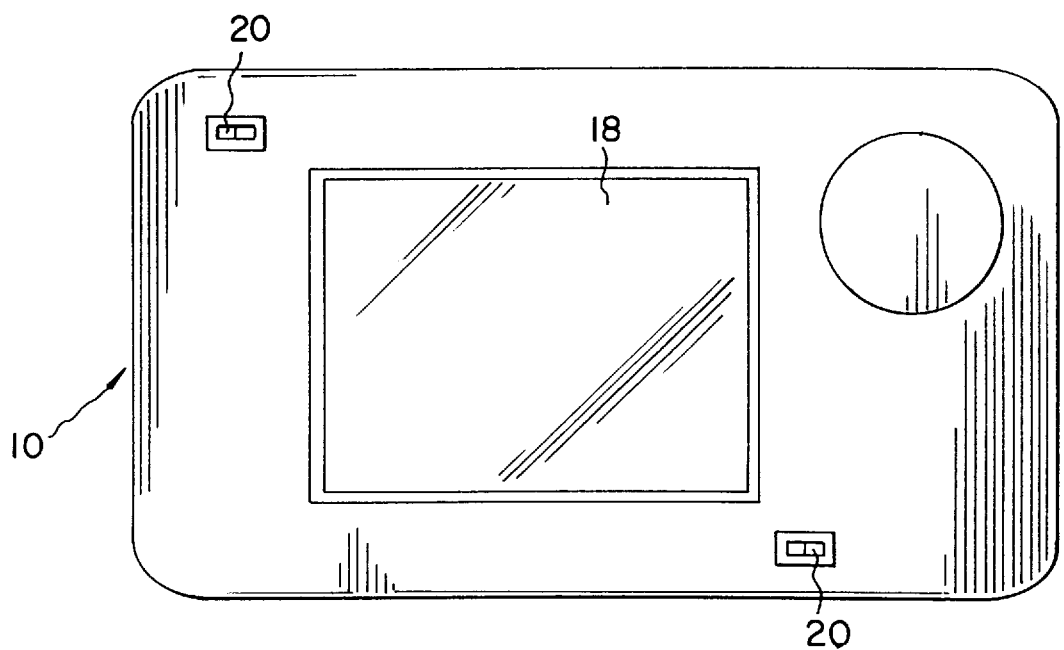
FIG. 5 is a rear view of the electronic camera shown in FIG. 1.

The printer 12 includes a light tight storage structure for receiving a stack of photosensitive sheets disposed relative to a camera opening as will be described shortly. The printer 12 has an active latch 24 and a passive latch 28 that permits the printer to be secured over the camera display 18. In this embodiment the latches 24 and 28 are hooked and secure to matching detail formed in the sockets 20 of camera 10. The rear view of the camera in FIG. 5 shows the position of the camera sockets 20 and camera display 18. A latch driver 26 permits the selective securing and release of printer 12 from camera 10 under control of printer electronics 30. A compliant, light tight mask is disposed on the printer an assembly includes printer 12 and electronic camera 10 which forms a light tight interconnection to camera display 18.

Figure 3:
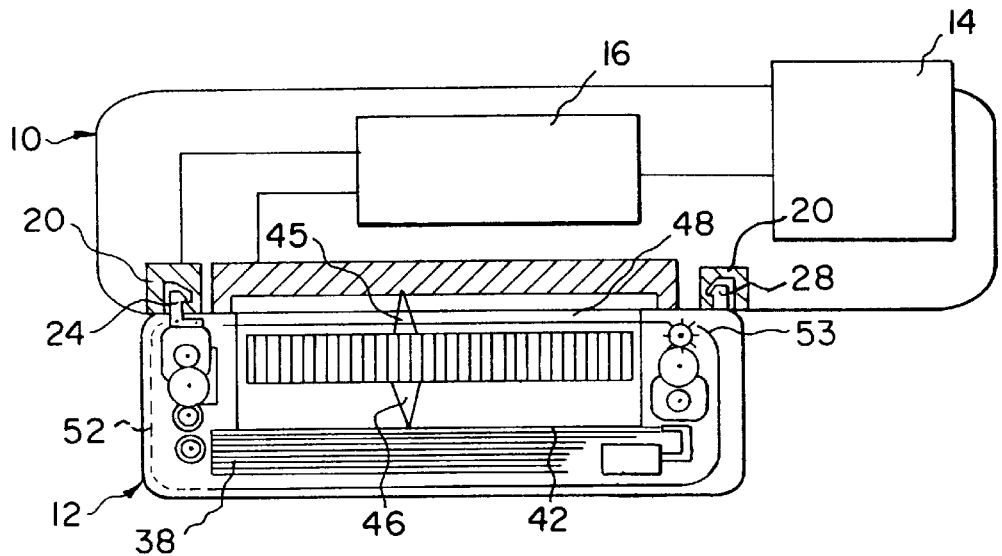
FIG. 3 shows the printer of FIG. 2 attached to the camera of FIG. 1.

FIG. 3 shows printer 12 secured to camera 10. The printer 12 contains a stack of media sheets 38. These sheets are light sensitive and are loaded into the camera and stored in light sensitive manner as is known in the art. Photosensitive sheets can be found in current art as instant silver-halide sheets or pressure sensitive microencapsulated crushable color particles such as disclosed in U.S. Pat. Nos. 4,768,050, 5,049,902, and 5,122,432. Alternatively, images can be stored on photographic film and then stored and chemically processed at a later time.

Light from the camera display 18 passes through a printer opening 48 to permit light to fall onto photosensitive media 42 within the printer 12. A shutter member 50 prevents photosensitive media 42 from exposure by covering printer opening 48. Shutter member 50 is a light opaque, compliant sheet that is free to travel shutter path 52 formed within printer 12. Motion of shutter member 50 maintains the light seal over photosensitive sheet 42 with the exception of light passing through shutter aperture 53 opening in shutter member 50.

Figure 6A:
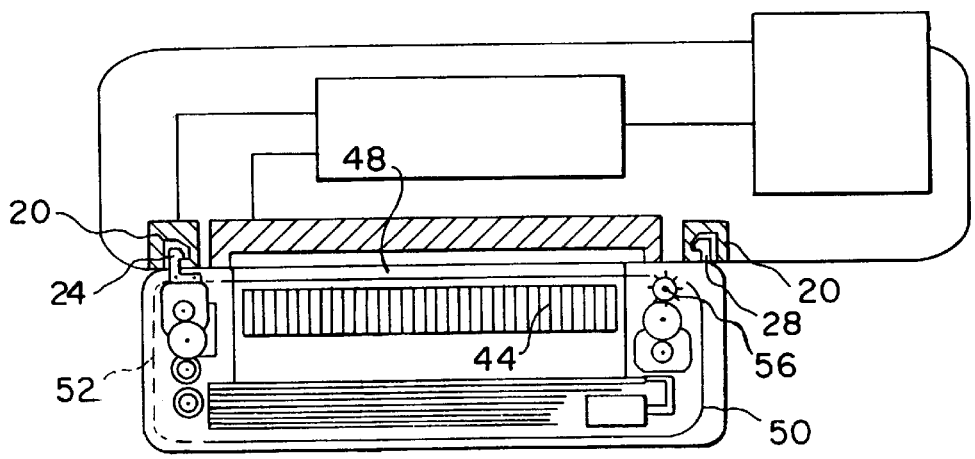
FIGS. 6a, 6b, and 6c are top sectional views showing an operating sequence of the camera-printer arrangement.

Shutter member 50 can be a 200 micron thick sheet of stainless steel, which has a black oxide plating. The use of stainless steel provides a light tight cover that is flexible. A black oxide coating or paint on shutter member 50 prevents flare light from fogging photosensitive sheet 42. As shown in FIG. 6a, the shutter member 50 is a flexible light-opaque sheet which, when the shutter member 50 is in its first position, over the photosensitive surface of the sheet. Shutter member 50 is free to move along a shutter path 52 so that shutter aperture 53 traverses the photosensitive surface of sheet 42. The printer has a printer opening 48 disposed relative to the camera display 18 for permitting light images from camera display 18 to pass through the opening 48 and shutter aperture 53 to expose a photosensitive surface of a photosensitive sheet.

Figure 4:
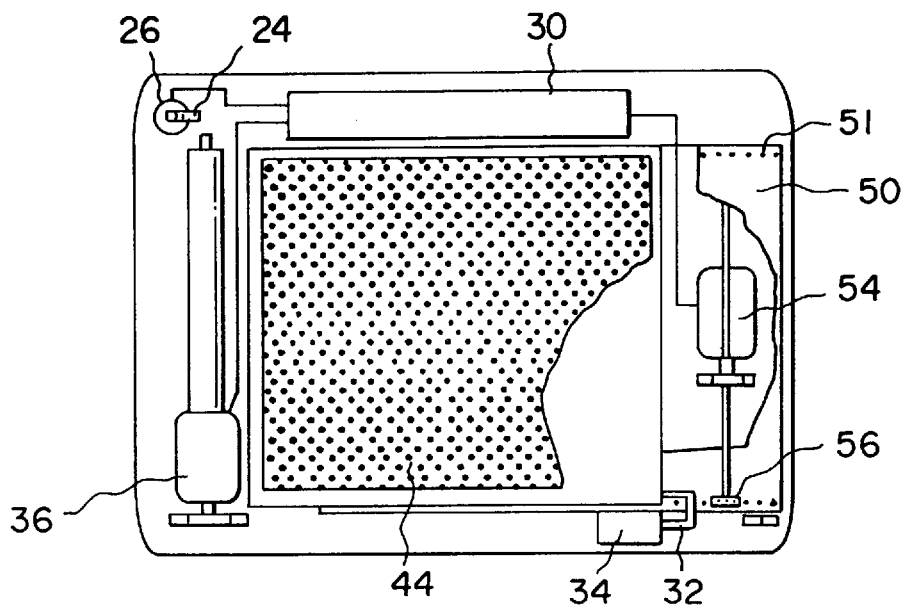
FIG. 4 is a front sectional view showing portions of the printer of FIG. 2.

Turning to FIG. 4, it can be seen that shutter member 50 has a set of shutter perforations 51 formed on either side of shutter 51. Location of shutter member 50 is controlled by shutter drive 54, which operates on sprockets 56 to move shutter member 50 through shutter path 52 under control of printer electronics 30. Shutter path 52 guides shutter member 50 in a path around the media to provide a small printer size.

Figure 7A:
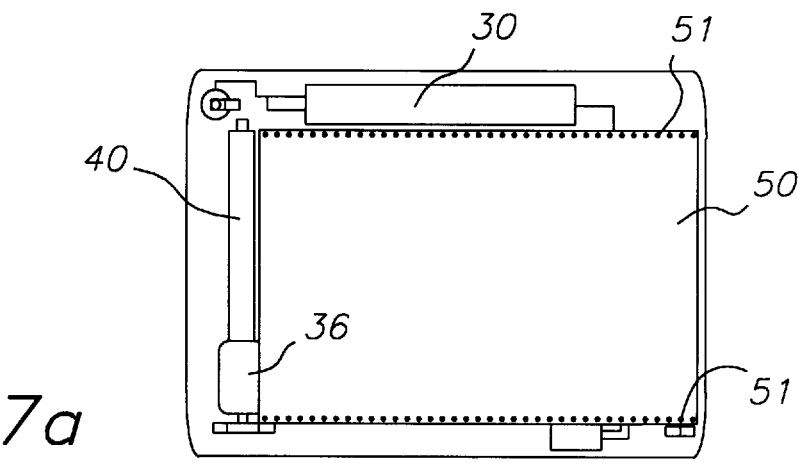
FIGS. 7a, 7b, and 7c are front sectional views of the operating sequence corresponding to FIGS. 6a, 6b, and 6c.
Figure 7B:
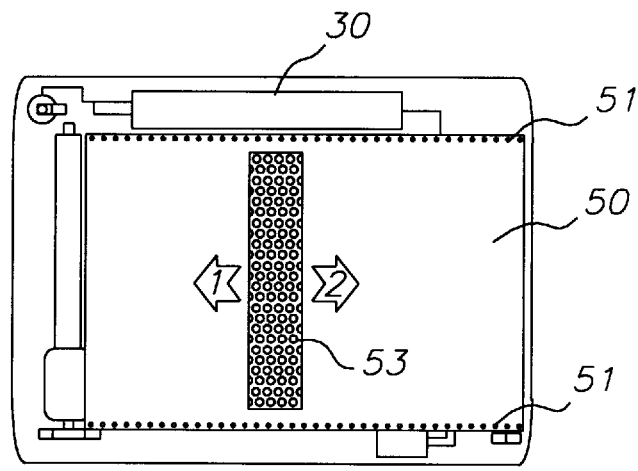
Figure 7C:
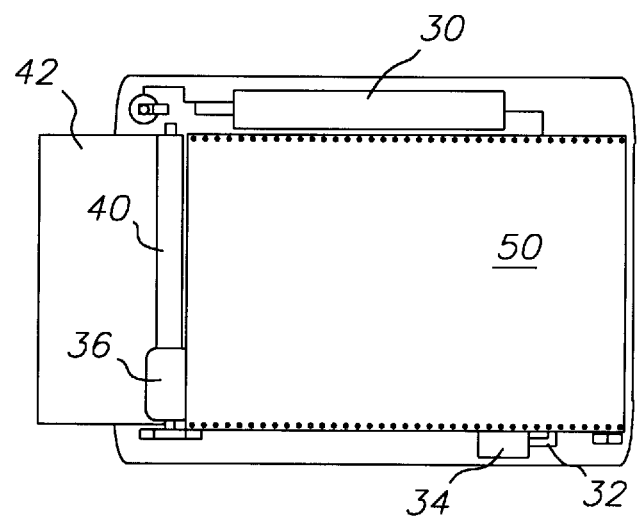

FIG. 7b shows that a shutter aperture 53 is formed in shutter member 50 to allow selective exposure of photosensitive sheet 42 as shutter member 50 is urged along shutter path 52 by shutter drive 54. Shutter drive 54 is activated to move shutter member 50 in a first direction "1" to create a first exposure as shutter aperture 53 is moved across photosensitive sheet 42. Shutter drive 54 is then operated in reverse direction "2" to move shutter member 50 out of shutter path 52 and back to the starting position. Photosensitive media is exposed twice; once as shutter aperture 53 moves in direction "1", a second time when shutter aperture 53 returns in direction "2". Exposure of the media is controlled by setting the width of shutter aperture 53 and the speed of shutter drive 54.

Figure 8:
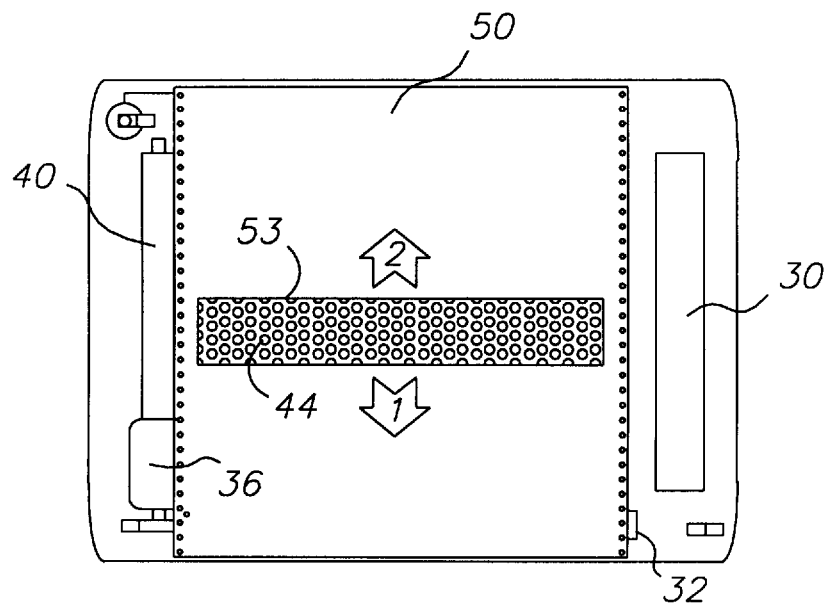
FIG. 8 is a cross sectional view of an alternative printer that is attachable to the camera of FIG. 1.
Figure 9:
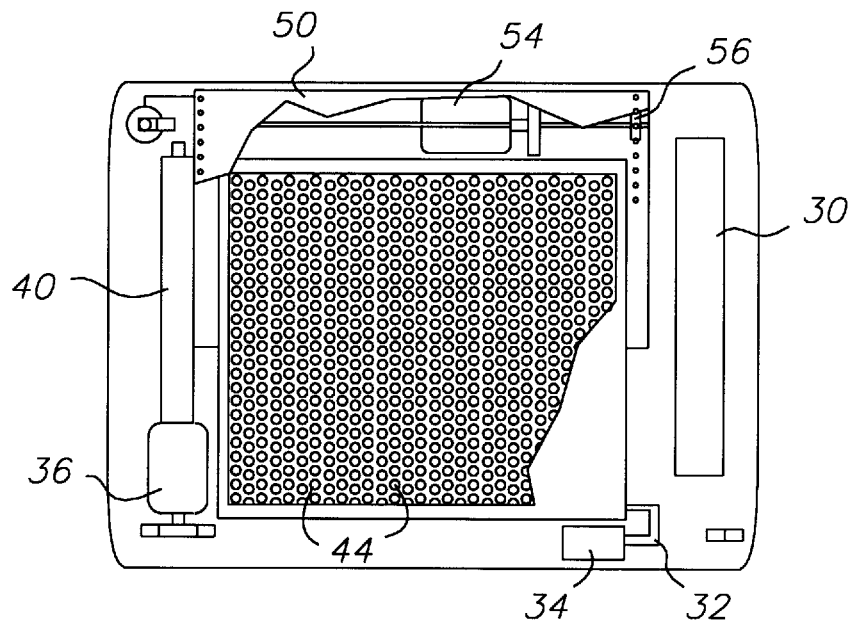
FIG. 9 shows another view of the alternative printer of FIG. 8.
Figure 10A:
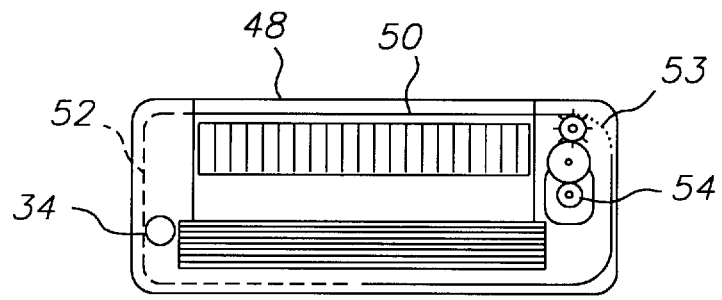
FIGS. 10a, 10b, and 10c show various operational positions of the printer of FIG. 8.
Figure 10B:
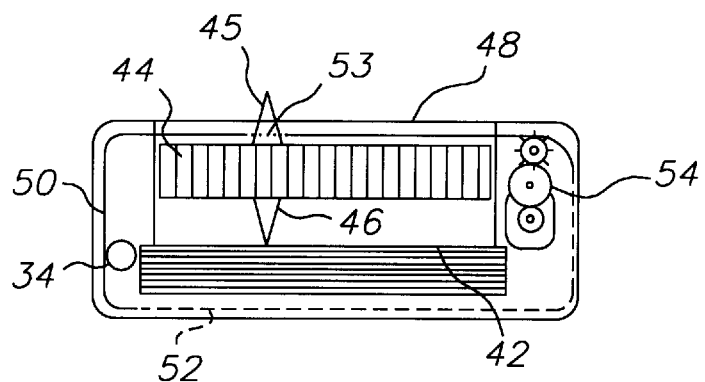
Figure 10C:
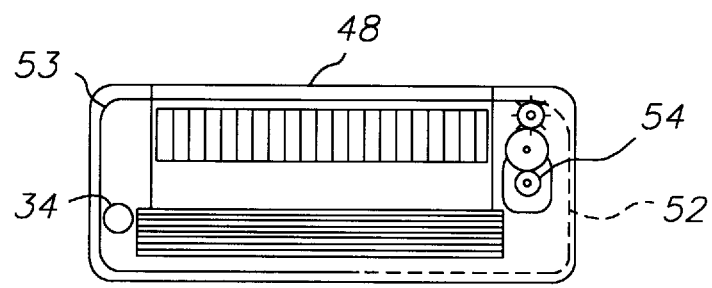

FIGS. 8 and 9 are drawings of an alternative embodiment. Shutter 50 and shutter driver 54 are positioned to move vertically across printer opening 48. Printer electronics 30 occupied the previous position of shutter drive 54. FIGS. 10a, 10b, and 10c are a side sectional view that show operation of shutter member 50 as in the first embodiment.

In this new embodiment, the motion of shutter member 50 does not cross in front of processing rollers 40. Because shutter member 50 never crosses in front of processing rollers 40, the exposure of photosensitive sheet 42 can be done using motion of shutter member 50 in one of two directions of motion, "1" and "2".

The second embodiment starts operation in one of two covering positions shown in FIGS. 10a and 10c. Under control of shutter drive 54, shutter member 50 moves across printer opening 48. When shutter member has moved to the other position, shutter aperture 53 has completed a single pass exposure across photosensitive sheet 42. Operation of printer 12 is controlled so that correct exposure is completed in the single pass. Shutter member 50 is left in the exposure terminating position. Printer electronics 30 drives shutter drive 54 in the opposite direction on a following exposure. Motion of shutter member 50 alternates for each exposure. Positioning of the components of the printer in this embodiment permits election of photosensitive sheet 42 with shutter member 50 in either position.

Figure 6B:
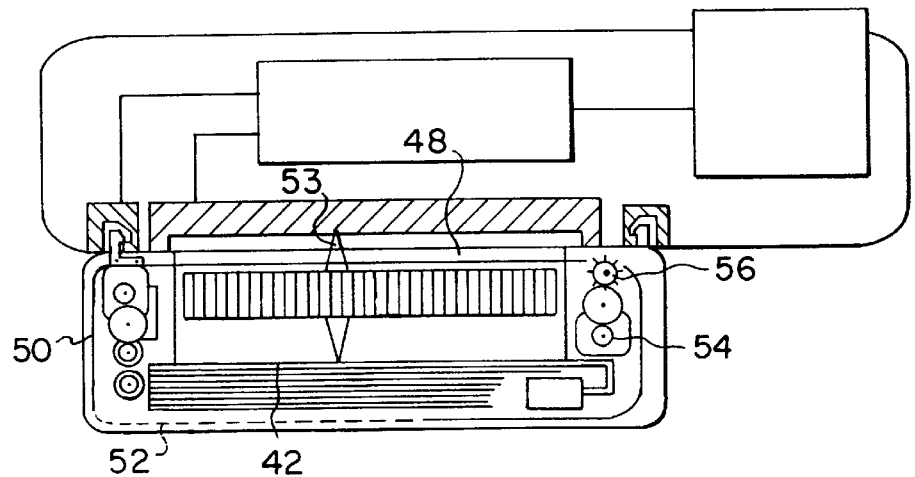

After exposure of photosensitive sheet 42, picker 32 is moved by picker drive 34 to urge photosensitive sheet 42 into processing rollers 40. Processing rollers 40 are driven by roller drive 36 under control of printer electronics 30. FIG. 6b shows that in this embodiment, shutter member 50 covers the exit for a processed photosensitive sheet 42 during exposure. This is not required for the invention but affords a compact arrangement of the inventions elements in certain embodiments.

Printing optic 44 is used to focus an image on camera display 18 onto photosensitive sheet 42. The printing optic 44 focuses a display area from the camera display 18 onto a photosensitive surface of the sheet nearest the opening. Printing optic 44 can be an array of gradient index rods that have been formed into a two dimensional array. Printing optic 44 can be formed from Nippon Sheet Glass rod lens array type 20B which has a total conjugate 15.1 mm. The actual element is 6.89 mm tall and first working distance 45 and second working distance 46 are 4.10 mm.

The sockets and latches are dimensionally controlled to align printing optic 44 with the light emitting elements of camera display 18. First working distance 45 should be located by the interface to focus on the light emitting elements of camera display 18. Second working distance 46 is provided for forming an image on the imaging surface of photosensitive sheet 42 as it lies on platen 35. Printing optic 44 is accurately positioned relative to the display when the printer is secured to the camera 10.

In FIGS. 6a and 7a, printer 12 has been attached to electronic camera 10. The operator signals printer electronics 30 to make a print. Camera electronics 16 senses that printer 12 is ready to make a print and activates camera display 18. In FIGS. 6b and 7b, printer electronics 30 operates shutter drive 54 to move shutter member 50 along shutter path 52 to expose photosensitive sheet 42 through shutter aperture 53. Printer electronics 30 then retracts shutter member 50 out of shutter path 52 and exposes photosensitive sheet 42 a second time through shutter aperture 53 to complete exposure of photosensitive sheet 42. After the two exposures shutter member 50 has cleared shutter path 52. This permits photosensitive sheet 42 to be urged by picker 32 into processing rollers 40. Processing rollers 40 are turned by process roller drive 26 to process the latent image formed on photosensitive sheet 42. Processing rollers 40 continue to operate until photosensitive sheet 42 has exited the camera transverse to shutter path 52.

In the case of silver halide imaging, a pod of chemicals at the beginning of photosensitive sheet 40 is burst by processing rollers 40. The chemicals are spread across the image of photosensitive sheet 42 as photosensitive sheet 42 passes through processing rollers 40. Said chemicals operate on the latent image to create a permanent colored dye image on photosensitive sheet 42. In the case of crushable media, the rollers apply pressure to micro-beads containing the latent image. Burst micro-beads release dye chemistries onto photosensitive sheet 42 to create a permanent color image.

Figure 6C:
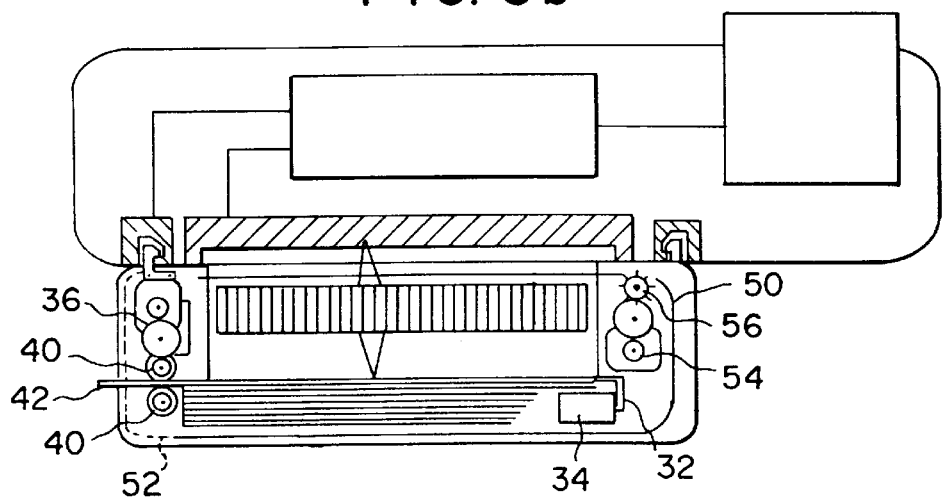

Operation of the invention is shown in FIGS. 6a–6c. In FIG. 6a, an operator has mounted printer 12 onto electronic camera 10. Latches 24 and 28 automatically secure printer 12 in a light tight manner to camera display 18 on electronic camera 10. Printer 12 is securely attached to electronic camera 10 to prevent image damaging displacement between electronic camera 10 and printer 12. The operator signals the start of printing using printer electronics 30. In FIG. 6b, printer electronics 30 activates shutter drive 54 and moves shutter member 50 through shutter path 52 to expose photosensitive sheet 42 to camera display 18 using shutter aperture 53. Printer electronics 30 then retracts shutter member 50 from shutter path 52 to complete the second exposure by shutter aperture 53. Printer electronics 30 can be aware of the light sensitivity of photosensitive sheet 42 and sets exposure time correspondingly by controlling the speed of shutter drive 54.

FIG. 6c shows the system after exposure of photosensitive sheet 42. Printer electronics 30 activates picker drive 34 and uses picker 32 to move photosensitive sheet 42 into rotating urge roller 40. Processing rollers 40 grip and drive photosensitive sheet 42 out of printer 12, providing the operator with a color record of camera display 18.

The use of the latch driver 26 under the control of printer electronics 30 ensures that printer 12 is not detached from electronic camera 10 during image transmission from camera display 18 and printer receiver device 32. An operator detaches printer 12 from electronic camera 10 using an interface to printer electronics 30 such as a conventional switch. Printer electronics 30 then activates latch driver 26 to permit removal of printer 12 from camera 10.

The invention has been described in detail with particular reference to a certain preferred embodiment thereof, but it will be understood that variations and modifications can be effected within the spirit and scope of the invention. variations and modifications can be effected within the spirit and scope of the invention.

PARTS LIST 10 electronic camera
12 printer
14 camera head
16 camera electronics
18 camera display
20 camera sockets (2)
24 active latch
26 latch driver
28 passive latch
30 printer electronics
32 picker
34 picker drive
36 roller drive
38 media sheets
40 processing rollers
42 photosensitive sheet
44 printing optic
45 first working distance
46 second working distance
48 printer opening
50 shutter member
51 shutter perforations
52 shutter path
53 shutter aperture
54 shutter drive
56 sprockets

What is claimed is:

1. Apparatus for capturing and printing images on photosensitive sheets, comprising:
   a) a camera for electronically storing an image of a subject and having a display for displaying such stored image;
   b) a printer including light tight storage means for receiving a stack of photosensitive sheets; and
   c) means for imaging the display image onto a photosensitive sheet at the exposure position including:
      i) the printer including a movable shutter member having a shutter aperture and means for moving the movable shutter member across the displayed image for causing the shutter aperture to sequentially expose portions of the displayed image onto the photographic sheet until the entire displayed image is exposed onto such photographic sheet.

2. The apparatus of claim 1 further including optical means for focusing a portion of the displayed image through the movable shutter onto the photographic sheet.

3. The apparatus of claim 1 wherein the shutter member is flexible and movable within the printer from a first storage position to a second storage position after sheet exposure, the apparatus further including means for returning the shutter member to the first storage position.

4. The apparatus of claim 1 wherein the shutter member is flexible and movable within the printer from a first storage position to a second storage position after exposure of a first sheet and is movable back to the first storage position after the next sheet is exposed.

5. The apparatus of claim 1 further including means for preventing the printer unit from being detached from the camera during exposure.

6. The apparatus of claim 2 wherein the optical means includes rod lens arrays.

* * * * *